March 8, 1955  C. HUDKINS  2,703,657

HAND TRUCK

Filed March 16, 1954  2 Sheets-Sheet 1

Clyde Hudkins
INVENTOR.

BY Clarence A. O'Brien
and Harvey B. Jacobson
Attorneys

March 8, 1955     C. HUDKINS     2,703,657
HAND TRUCK

Filed March 16, 1954     2 Sheets-Sheet 2

Clyde Hudkins
INVENTOR.

BY *Clarence A. O'Brien*
*and Harvey B. Jackson*
Attorneys

United States Patent Office 2,703,657
Patented Mar. 8, 1955

2,703,657

HAND TRUCK

Clyde Hudkins, Wheeling, W. Va.

Application March 16, 1954, Serial No. 416,552

5 Claims. (Cl. 214—370)

My invention relates to improvements in hand trucks for handling freight such as packing cases and the like.

The primary object of my invention is to provide in a hand truck of the two wheeled carriage type, load lifting means on the carriage tiltable about the axis of the wheels to lift a load, in front of the carriage, and means on the load lifting means and carriage responsive to tilting of the lifting means and the weight of the load to move the carriage forwardly of the lifting means and under the load so that the load may be substantially balanced on the carriage for easy transporting by the truck.

Another object is to provide in a truck a load supporting turntable on the carriage movable by the carriage under the load when the carriage moves forwardly of the lifting means and whereby to facilitate balancing the load on the carriage.

Still another object is to provide in conjunction with the foregoing load lifting means forming a handle for the truck.

Still another object is to provide a truck operative and constructed as specified in the foregoing and which is of simple inexpensive construction light in weight, yet strong, and can be handled by one hand of an operator.

Other and subordinate objects will become apparent when the succeeding description and claims are read with reference to the drawings accompanying and forming part of this specification.

Figure 1:
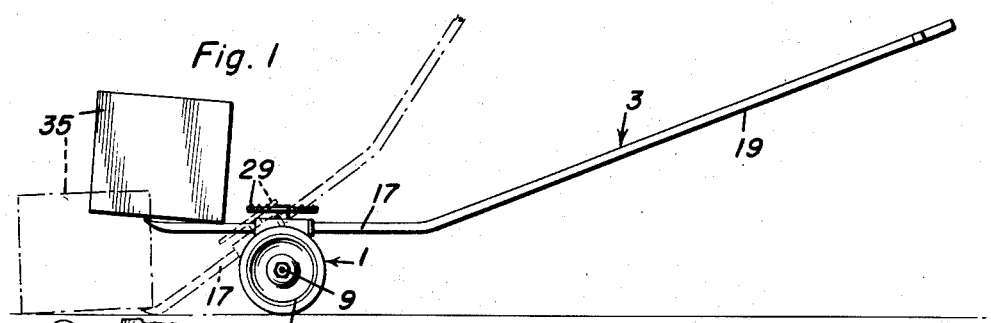
Figure 1 is a view in side elevation of a preferred embodiment of my hand truck and illustrating in full and broken lines the manner in which it is operated in lifting a load.

Referring to the drawings by numerals and first to Figures 1 to 5 thereof my improved hand truck in the preferred embodiment thereof comprises a two wheeled carriage designated generally by the numeral 1, and a combined lifting and handle bar 3.

The carriage 1 comprises a pair of suitable wheels 5 rotatably secured by nuts 7 on the ends of an axle bar 9 which supports an elongated bolster 11 to the bottom of which the axle bar 9 is clamped by a clamping plate 13 secured to the bottom of the bolster 11 by nuts 15. The bolster 11 may be of any suitable construction but for illustrative purposes has been shown as rectangular block member extending endwise between the wheels 5 and projecting slightly above the same for a purpose presently apparent.

The combined lifting and handle bar 3 comprises a substantially straight, front lifting bar section 17 of rectangular cross section extending transversely of the carriage 1 and slidable through a rectangular transverse bore 19 in the upper portion and vertical center of the bolster 11, the arrangement being such that said lifting bar section 17 is disposed at an angle normal to the bolster 11 which, together with carriage 1, is slidable longitudinally along said section 17 forwardly and rearwardly on said section 17. Conversely lifting bar section 17 is slidable forwardly and rearwardly in the bolster 11, which is to say the carriage 1.

An obtuse angled rear handle section 19 of bar 3, preferably has its front end threaded as at 21 into the rear end of the lifting bar section 17 and inclines upwardly and rearwardly of said section 17 and carriage 1 for a particular purpose presently seen. A stop collar 23 on the front end of the handle bar section 19 engages bolster 11 to limit sliding of said lifting bar section 17 into lifting position. The lifting bar section 17 is formed with a front end toe porton 27 which is widened, upturned and wedge shaped to bite into and hold against the bottom of a load.

A load supporting turntable 29 surmounts the bolster 11 in the center thereof and which is serrated as at 31 to prevent the load from slipping off the same and rotatably mounted on a stud 33 threaded into said bolster 11.

In operating the described preferred embodiment of my truck, the lifting bar section 17 is slid forwardly in the bolster 11 into lifting position by pushing on the handle bar section 19 until the stop collar 23 engages bolster 11. A load to be lifted for instance, a packing case 35 is tilted upwardly, for instance as shown in broken lines in Figure 1, and supported by blocks, not shown. The carriage 1 is then pushed forwardly by handle section 19, up to the packing case 35, hand section 19 tilted upwardly to tilt the lifting section 17 downwardly and forwardly, as shown in broken lines in Figure 1, so that the lifting bar section 17 may be positioned under said case 35, and carriage 1 in then again moved forwardly to shove lifting bar section 17 under the case 35 in substantially the position shown in full lines in Figure 1 and with said case balanced on said section 17 against lateral tilting. Then the handle section 19 is depressed to swing the lifting bar section 17 upwardly and lift the case 35 until the lifting bar section 17 is rocked into upwardly and forwardly inclined position for instance as shown in broken lines in Figure 2. Until the lifting bar section 17 is rocked past horizontal position the carriage 1 and lifting bar section 17 remain relatively immovable so that lifting bar section 17 fulcrums about a relatively fixed axis as illustrated in full lines in Figure 1.

Figure 2:
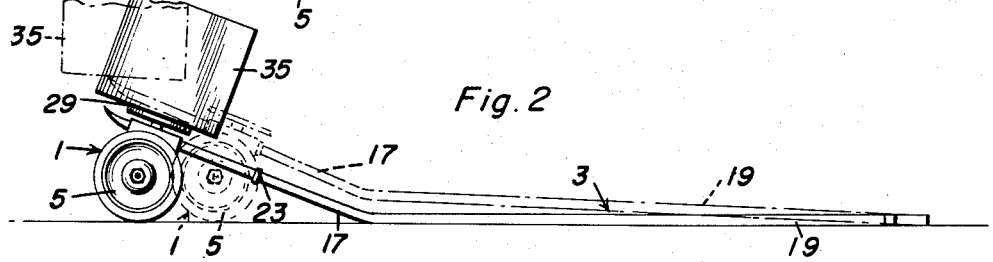
Figure 2 is a view in side elevation illustrating in full and broken lines the manner in which the carriage moves under the load.
Figure 3:
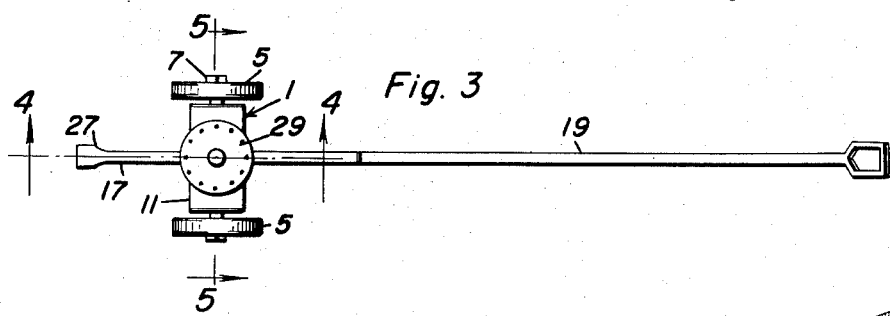
Figure 3 is a view in plan.
Figure 4:
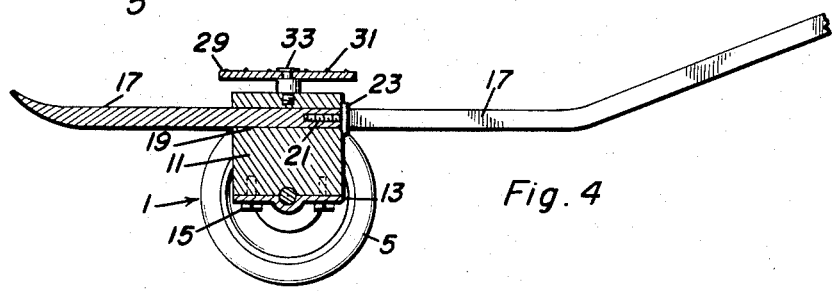
Figure 4 is a fragmentary enlarged view in vertical longitudinal section taken on the line 4—4 of Figure 3.
Figure 5:
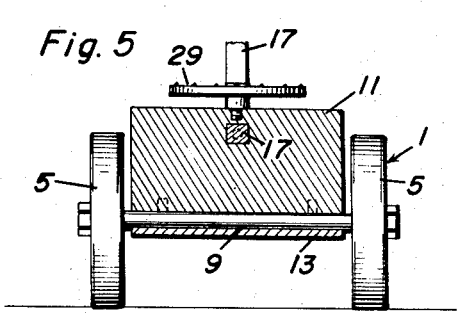
Figure 5 is an enlarged view in vertical transverse section taken on the line 5—5 of Figure 3.
Figure 6:
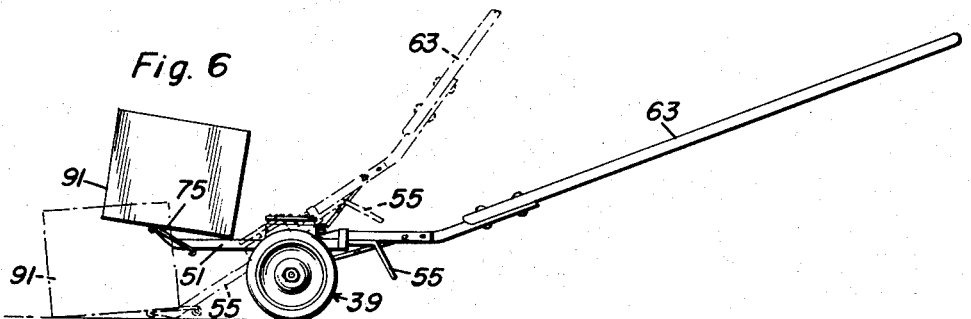
Figure 6 is a view in side elevation of a modified embodiment of my hand truck and illustrating in full and broken lines the manner in which it is operated in picking up a load.

When the lifting bar section 17 is rocked into a forwardly and upwardly inclined position the bolster 11 is rocked into a rearwardly inclined position about the axis of the wheels 5 as shown in broken lines in Figure 2. When said section 17 and bolster 11 are thus sufficiently inclined the weight of the load on the bolster 11 is shifted behind the axis of the wheels 5 so that, if the handle section 19 is held depressed, the upwardly inclined or tilted lifting bar section 17 will, under the weight of the load, cam the bolster 11 and hence the carriage 1 forwardly of said section 17 to position the turntable 29 under the case 35 or load, if the case is manually tilted on said toe portion 27, as shown in broken lines in Figure 2, so that the turntable 29 may pass under and support said case as shown in full lines in Figure 2.

In the modified embodiment shown in Figures 6 to 11 a two wheeled carriage 39 like the carriage 1 is provided and includes a bolster 41, a pair of wheels 43 on an axle bar 45, a clamping plate 47 for clamping the axle bar 45 to the bottom of the bolster, and a load supporting turntable 49 constructed and arranged as in the preferred embodiment.

A load lifting bar section 51 like the bar section 17 with the exceptions presently noted, is slidable through the carriage and on which the bolster 41 is slidable all as in the preferred embodiment except that front and rear antifriction units 52, 53 set into said bolster 41 support said bar section 51 and said bar section 51 is provided with a downturned heel tooth portion 55 and an apertured top guide lug 57 for a purpose presently seen.

An obtuse angled front handle bar section 59 extends rearwardly centrally from the bolster 41 and has bolted thereto, as at 61, a rear handle bar section 63 inclining upwardly and rearwardly from said bolster 41. A terminal hook 65 on the front end of the handle bar section 59 engages a staple like keeper 67 on the rear side of the bolster 41 so that said section 59 is detachably attached to said bolster 41. The lug 57 slides on the front handle bar section to guide the lifting bar section 51.

A pair of diagonal brace rods 69 on opposite sides of the handle bar section 59 are bolted thereto, as at 71, and incline downwardly to the bolster 41 to which said rods are attached, as at 73, said rods 69 maintaining said handle bar section 59 rigidly connected to said bolster 41.

A load engaging guard plate 75 is provided for attachment to the upturned front end toe portion 77 of the lifting bar section 51. Plate 75 is bifurcated as at 76 to fit over said bar section 51 and rest on the toe portion 77. A transverse front edge keeper channel 79 fits downwardly over the toe portion 77. A transverse rod 81 over which the rear edge of the plate 75 is rolled and fixed as at 83 underlies the lifting rod section 51 to prevent said plate from tilting upwardly on said section 51. The plate 75 may when not in use, be lifted to disengage the channel from the toe portion 77, then slid rearwardly on the lifting bar section 51 and dropped into a pair of channel keeper bars 85 on the front side of bolster 41 and opposite sides of said section 51. Diagonal side edges 87 on said plate 75 engage diagonal portions 89 of said keeper bars 85 to wedge said plate 75 into said bars 85.

In operating the modified embodiment of the truck the lifting bar section 51 is slid forwardly in the bolster 41, or carriage 39, to extend forwardly of the carriage 39 by foot pressure on the heel portion 55. Such sliding of said bar section 51 is limited by engagement of lug 57 with keeper 67. However, the lifting bar section 51 may be slid forwardly short of its limit of movement if desired. The carriage 39 may then be pushed up to a packing case 91, for example, the lifting bar section 51 tilted to pick up and lift the load all by manipulation of the rear handle bar section 63 as shown in full and broken lines in Figure 6 and in the same manner as described with reference to the preferred embodiment. Then the rear handle bar section 63 may be depressed close to the floor to tilt the lifting bar section 51 upwardly and forwardly as shown in broken lines in Figure 7 so that the bolster 41 and carriage 39 will be cammed forwardly as in the preferred embodiment to position the same under the case 91, or load, for support of said case by the turntable 49 as shown in full lines in Figure 7.

Figure 7:
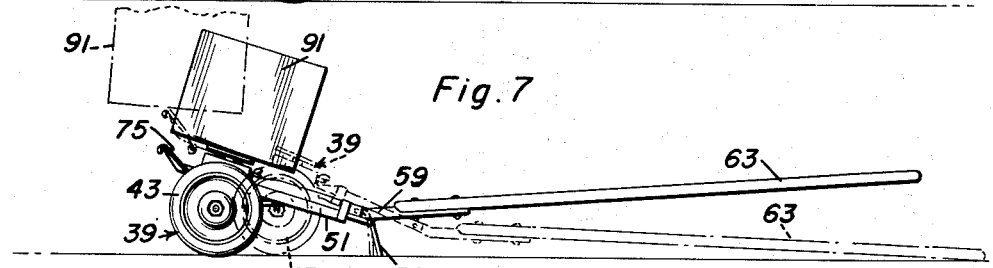
Figure 7 is a view in side elevation of the same illustrating in full and broken lines the manner in which the carriage moves under the load.
Figures 8, 9:
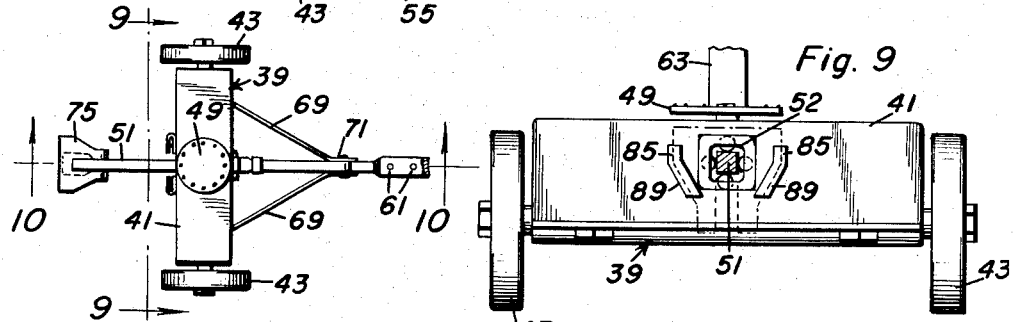
Figure 8 is a fragmentary view in plan of the modified embodiment.
Figure 9 is an enlarged view in vertical transverse section taken on the line 9—9 of Figure 8.
Figure 10:
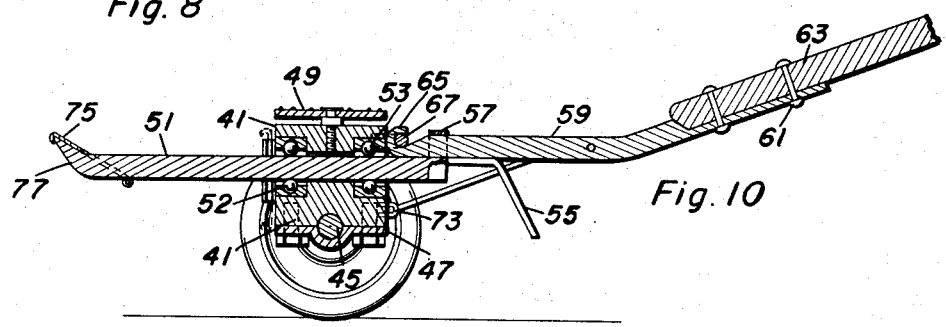
Figure 10 is an enlarged fragmentary view in vertical longitudinal section taken on the line 10—10 of Figure 8.
Figure 11:
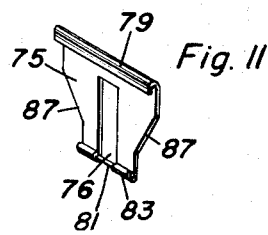
Figure 11 is an enlarged perspective view of a load stabilizing plate for the load lifting bar of the modified embodiment.

When the handle bar section 63 is depressed or lowered close to the floor, the heel tooth portion 55 of lifting bar section is engaged with the floor as shown in Figure 7 to hold said bar section 51 against free rearward sliding so that it cams the carriage 39 forwardly. In this connection the lifting bar section 51 may be held against rearward sliding under the weight of the load in its upwardly and forwardly tilted position by the operator placing one foot against the heel portion 55 until said portion is lowered to the floor.

A particular advantage of the turntables 31, 49 is that a pair of the hand trucks may be used at opposite sides of a load for support on the turntables of the pair, a load lifted by the trucks and the trucks may be turned under the turntables for wheeling in any desired direction.

The guard plate 75 prevents the toe portion 77 from crushing and damaging fragile crates and boxes.

The foregoing will suffice to impart a clear understanding of my invention without further explanation.

Manifestly my invention is susceptible of modification without departing from the inventive concept and right is herein reserved to such modifications as fall within the scope of the invention as herein disclosed.

What is claimed as new is as follows:

1. A hand truck including a carriage having an axle provided with wheels and an elongated member mounted on and extending along said axle, a load lifting and supporting bar section slidable through said member transversely of the axle into a forwardly extending position relative to the carriage to support a load thereon forwardly of the carriage, said member being slidable forwardly along said bar section for positioning the carriage under a lifted load on said bar section, said member and bar section being rockable about the axis of the wheels to shift the weight of the load on the carriage rearwardly of the axis of the wheels and tilt said bar section upwardly and forwardly so that said bar section under the weight thereon will slide the member forwardly with a camming action, and handle means for rocking said member and bar section.

2. A hand truck according to claim 1 and a turntable on said member above said bar section movable under the load by sliding movement of said member forwardly, said bar section in its forwardly extending position extending forwardly of said turntable.

3. A truck according to claim 1, said handle means being rigidly secured to said member and extending rearwardly therefrom, and said bar section being slidably connected to said handle section.

4. A truck according to claim 1, said bar section having a rear downturned heel tooth portion being engageable with a floor when said first named bar section is tilted upwardly and forwardly and to hold said first named bar section against sliding rearwardly relative to the carriage.

5. A truck according to claim 1 and a load stabilizing plate attachable to said bar section in front of said member.

References Cited in the file of this patent
UNITED STATES PATENTS

| | | |
|---|---|---|
| 112,538 | Brown | Mar. 14, 1871 |
| 531,189 | Hutchinson | Dec. 18, 1894 |
| 1,985,362 | Clyde | Dec. 25, 1934 |